United States Patent [19]

Hu et al.

[11] Patent Number: 5,778,710
[45] Date of Patent: Jul. 14, 1998

[54] DEVICE FOR LOCKING GEAR SHIFT OF MOTOR VEHICLE

[76] Inventors: Hsi-Yen Hu, 14 Lane Pa Tei, Yung Ching Hsiang, Changhua, Taiwan; Yuan-Chih Chiang, 386 Shan Chiao Road, Sec. 3, She Tou Hsiang, Changhua, Taiwan

[21] Appl. No.: 886,945

[22] Filed: Jul. 2, 1997

[51] Int. Cl.[6] .................................................. B60R 25/06
[52] U.S. Cl. ............................ 70/247; 70/203; 70/192; 74/526
[58] Field of Search .................. 70/201–203, 245–248, 70/192, 237, DIG. 9; 74/526, 473.21

[56] References Cited

U.S. PATENT DOCUMENTS

| | | | |
|---|---|---|---|
| 5,081,856 | 1/1992 | Hsu | 70/247 |
| 5,309,744 | 5/1994 | Kito et al. | 70/248 |
| 5,555,755 | 9/1996 | Padrin | 70/202 |
| 5,561,996 | 10/1996 | Chang | 70/247 |
| 5,682,777 | 11/1997 | Specht | 70/247 |

FOREIGN PATENT DOCUMENTS

| | | | |
|---|---|---|---|
| 1090529 | 10/1960 | Germany | 70/247 |
| 203744 | 4/1966 | Sweden | 70/247 |

*Primary Examiner*—Steven N. Meyers
*Assistant Examiner*—Tuyet-Phuong Pham
*Attorney, Agent, or Firm*—Beveridge, DeGrandi, Weilacher & Young LLP

[57] ABSTRACT

A device for locking the gear shift of a motor vehicle is made up of a lock seat, a shackle and a lock body. The lock seat is provided with ratchet teeth engagable with the ratchet teeth of the lock seat. The lock body is mounted on a gear shift mount of the motor vehicle and is provided with a stopping block and a lock core. The stopping block has a tapered free end capable of being moved downwards by the lock core so as to be caught by the toothed portion of the lock seat, thereby enabling the gear-shifting lever to be locked securely at the park gear position.

2 Claims, 5 Drawing Sheets

DEVICE FOR LOCKING GEAR SHIFT OF MOTOR VEHICLE

FIELD OF THE INVENTION

The present invention relates generally to a locking deal., and more particularly to the locking device for incapacitating the gear shift of a motor vehicle.

BACKGROUND OF THE INVENTION

There are a variety, of conventional locking devices for disabling the gear shift of a motor vehicle so as to prevent an unauthorized person from operating the motor vehicle. Such conventional locking devices as mentioned above are generally defective in design in that then are provided with a key hole, which can not be easily, located by an operator of the motor vehicle, especially when the motor vehicle is parked at a poorly-lit area. In addition, the conventional gear shift locking devices are vulnerable to tampering by an unauthorized person and are therefore not burglar-proof.

SUMMARY OF THE INVENTION

The primary objective of the present invention is therefore to provide an improved device for locking the gear shift of a motor vehicle. The improved device of the present invention is free from the shortcomings of the conventional gear shift locking devices described above.

In keeping with the principle of the present invention, the foregoing objective of the present invention is attained by a locking device, which is secured to the gear shift mount of a motor vehicle and is composed of an arcuate lock seat and a U-shaped shackle. The arcuate lock seat has an upright portion and a horizontal portion. The upright portion consists of an upper side, a lower side having a toothed portion facing the upper side, and an open space located between the upper side and the toothed portion of the lower side. The horizontal portion consists of an arcuate indentation which is provided with ratchet teeth. The U-shaped shackle is provided with ratchet teeth engageable with the ratchet teeth of the horizontal portion of the arcuate lock seat, and a through hole. The gear shift mount is provided with a lock body fastened therewith. The lock body is engageable with the teeth of the toothed portion of the lower side of the upright portion of the lock seat when the gear-shifting lever is locked by the shackle which is engaged with the horizontal portion of the lock seat.

The foregoing objective, features and functions of the present invention will be more readily understood upon description of a preferred embodiment of the present invention with reference to the accompanying drawings.

DETAILED DESCRIPTION OF THE EMBODIMENT

Figure 1:
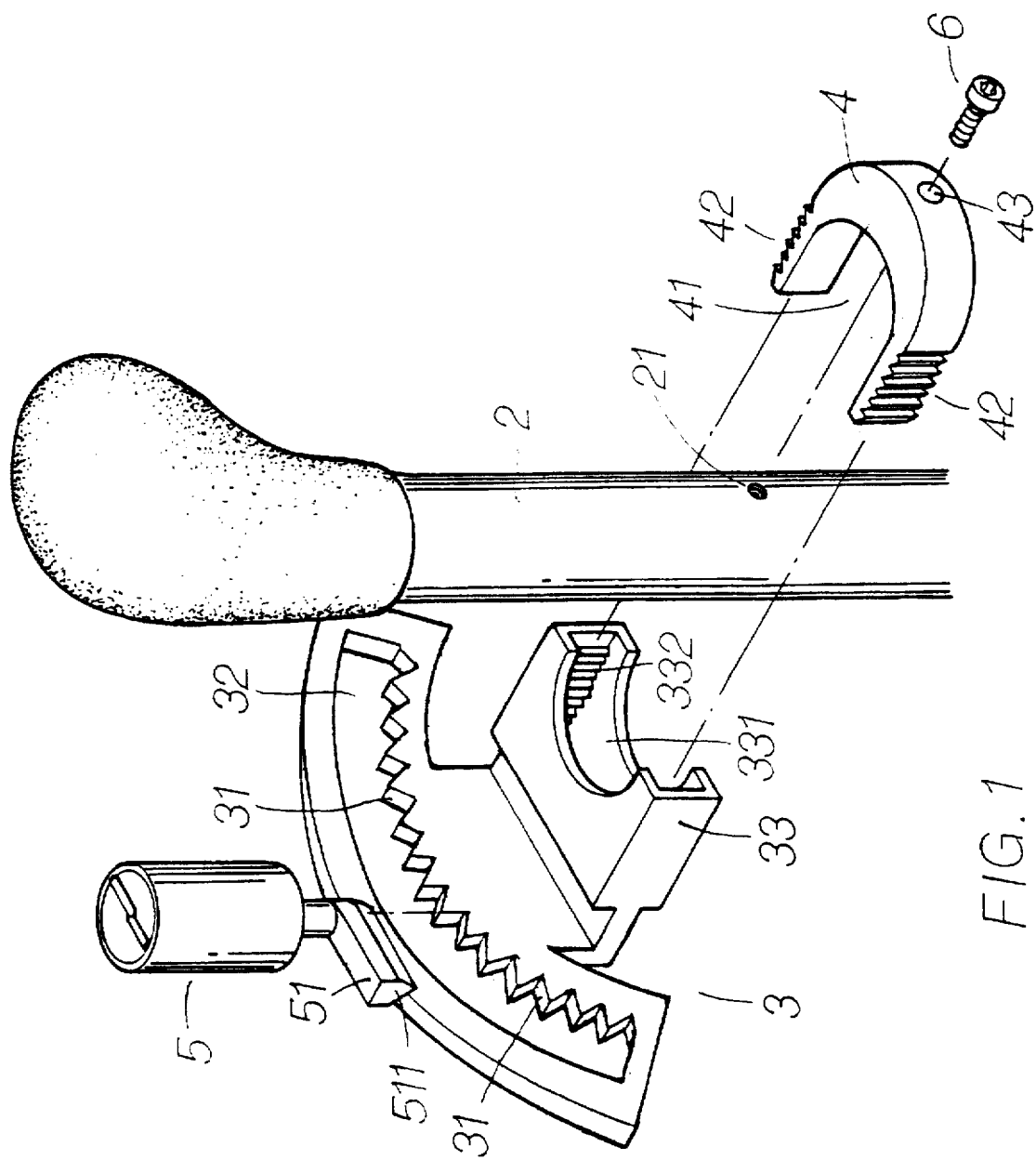
FIG. 1 shows an exploded view of the present invention in relation to the gear-shifting lever of a motor vehicle.
Figure 2:
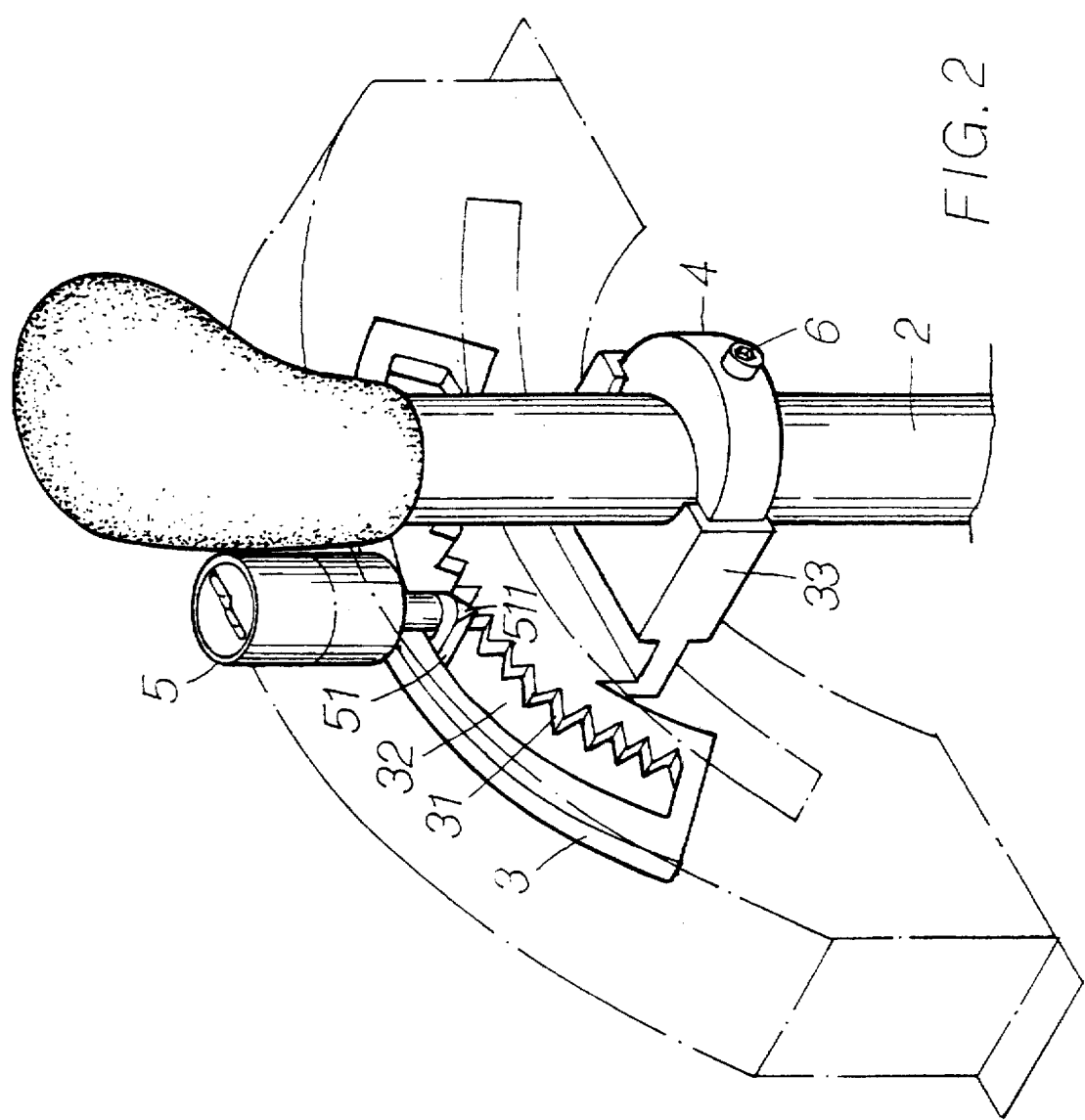
FIG. 2 shows a schematic view of the present invention in combination.
Figure 3:
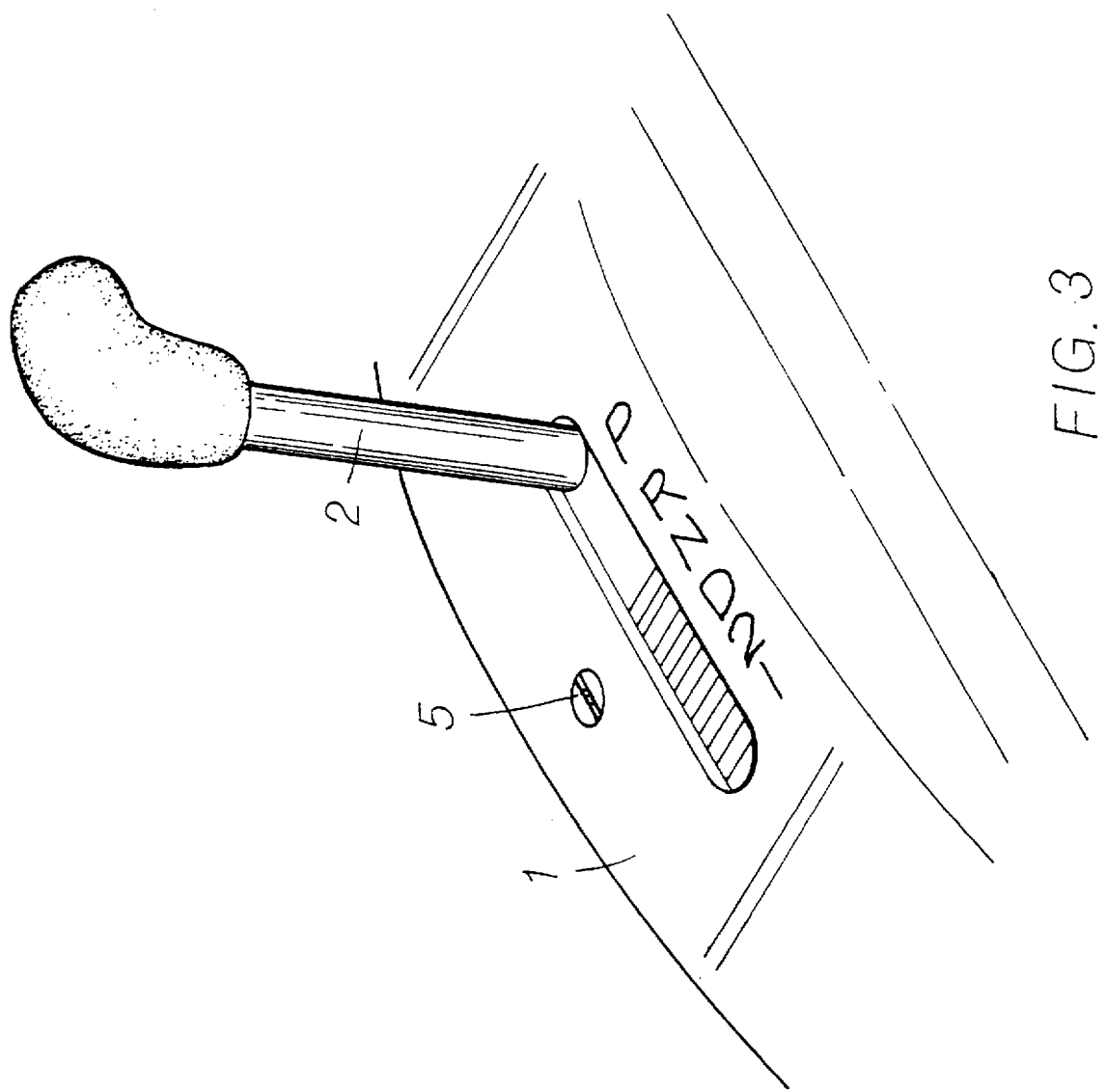
FIG. 3 shows a schematic view of the present invention mounted along with the gear shift mount of a motor vehicle.

As shown in FIGS. 1–3. a locking device embodied in the present invention is composed of a lock seat 3, a shackle 4, and a lock body 5.

The lock seat 3 has a upright portion and a horizontal portion. The upright portion consists of an upper side, a lower side having a toothed portion 31 facing the upper side, and an open space 32 located between the upper side and the toothed portion 31. The horizontal portion consists of a fastening seat 33, which is provided with an arcuate indentation 331 having ratchet teeth 332.

The shackle 4 is of a U-shaped construction and is corresponding in shape and size to the arcuate indentation 331 of the fastening seat 33. The shackle 4 has an arcuate open space 41 and is provided on the outer walls of both arms of the shackle 4 with ratchet teeth 42 engageable with the ratchet teeth 332 of the fastening seat 33. The shackle 4 is further provided at the center of the head portion thereof with a through hole 43 engageable with a bolt 6.

The lock body 5 is mounted on the gear shift mount 1 of the motor vehicle and is provided with a stopping block 51 having a tapered bottom 511. The lock body 5 has a lock core which can be pressed down to be located. The lock body 5 is mounted on the gear shift mount 1 such that the tapered bottom 511 of the stopping block 51 is located in the open space 32 of the uptight portion of the lock seat 3.

In operation, a gear-shifting lever 2 of the motor vehicle is locked by the shackle 4 which is engaged with the fastening seat 33. The gear-shifting lever 2 is further held securely by the bolt 6, which is engaged with the through hole 43 of the shackle 4 and a threaded hole 21 of the gear-shifting lever 2.

Figure 4:
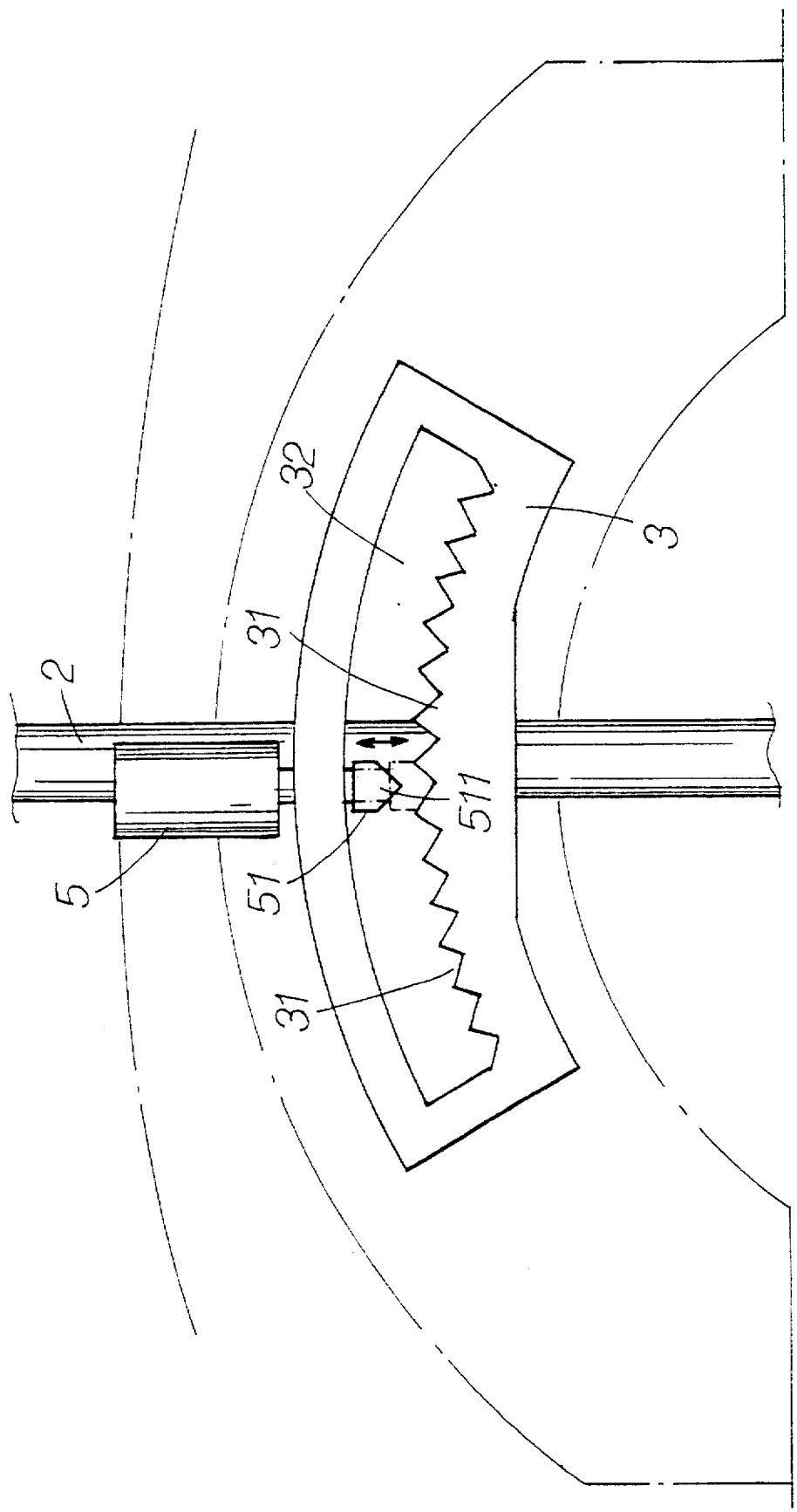
FIG. 4 shows a schematic view of the present invention at work.
Figure 5:
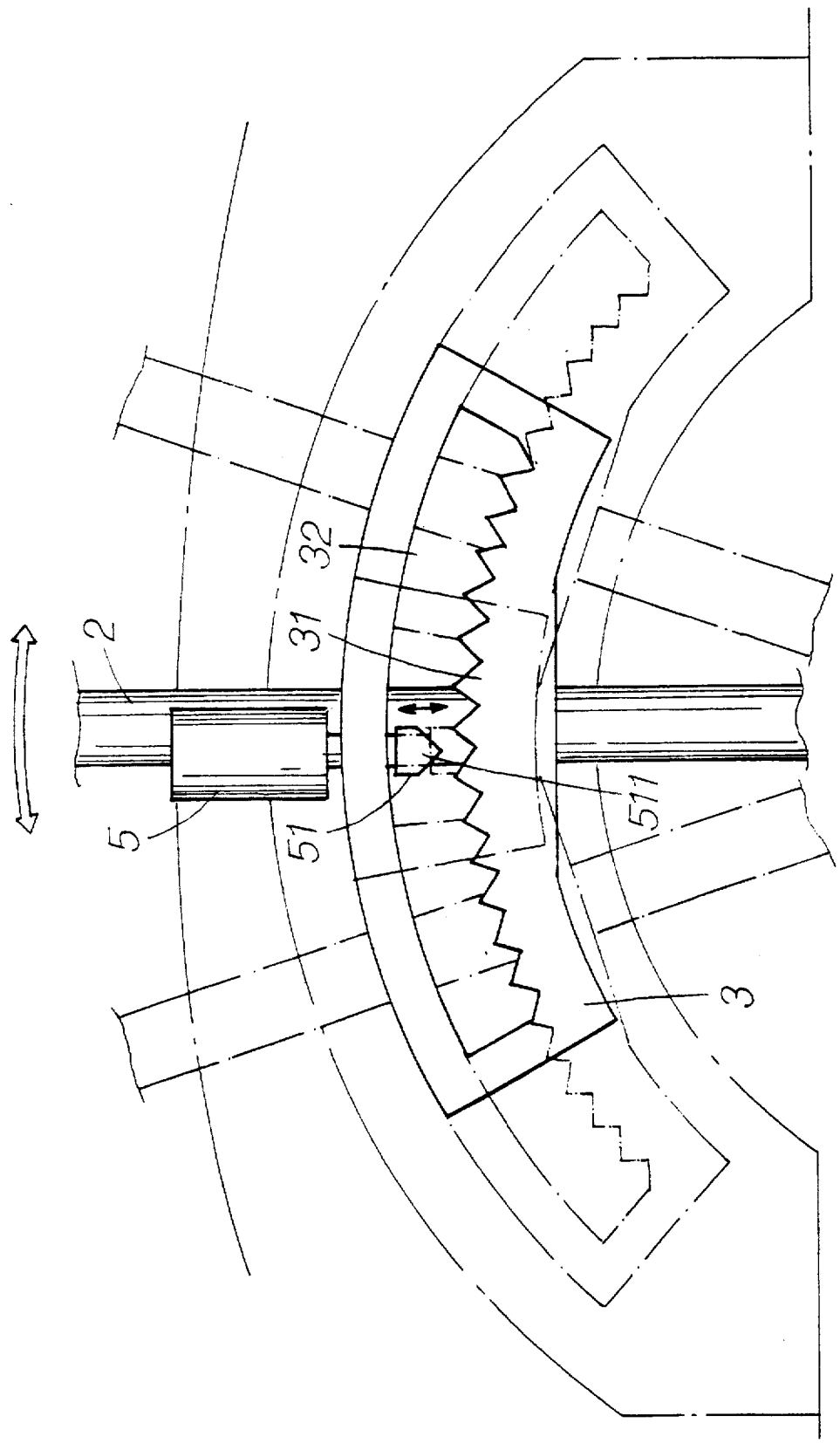
FIG. 5 shows another schematic view of the present invention at work.

As illustrated in FIG. 4 and 5, the gear-shifting lever 2 can be locked and located at the park gear position by using a key to press down the lock core of the lock body 5 such that the tapered bottom 511 of the stopping block 51 is caught by the toothed portion 31 of the lock seat 3. The tapered bottom 511 of the stopping block 51 can be released by the toothed portion 31 of the lock seat 3 by using the key to rotate the lock core upwards.

The embodiment of the present invention described above is to be deemed in all respects as being merely illustrative and not restrictive. Accordingly, the present invention may be embodied in other specific forms without deviating from the spirit thereof. The present invention is thereof to be limited only by the scope of the following appended claim.

What is claimed is:

1. A device for locking a gear shift of a motor vehicle, said device comprising:

a lock seat having an upright portion and a horizontal portion, said upright portion consisting of an upper side, a lower side having a toothed portion, and an open space located between said upper side and said toothed portion of said lower side, said horizontal portion consisting of a fastening seat provided with an indentation having ratchet teeth;

a shackle corresponding in shape and size to said indentation of said fastening seat and having two arms provided with ratchet teeth engageable with said ratchet teeth of said fastening seat, said shackle further provided with a through hole engageable with a fastening bolt; and a lock body provided with a stopping block having a tapered free end and secured to a gear shift mount of the motor vehicle such that said tapered free end of said stopping block is located in said open space of said upright portion of said lock seat, said lock body further provided with a lock core movably housed in said lock core such that said lock core can be rotated downwards by a key to enable said tapered free end of said stopping block of said lock body to be caught by said toothed portion of said lock seat. and that said lock core can be rotated upwards by the key to enable said tapered free end of said stopping block of said lock body to be released by said toothed portion of said lock seat.

2. The device as defined in claim 1, wherein said shackle embraces a gear-shifting lever of the motor vehicle such that a fastening bolt is engaged with said through hole of said shackle and a threaded hole of said gear-shifting lever.

* * * * *